Oct. 18, 1960 J. M. URITIS 2,957,049

PRESSURE APPLYING MEANS FOR THE TAPE OF A MAGNETIC RECORDER

Filed Sept. 1, 1954

INVENTOR.
Joseph M. Uritis
BY Morris A. Robkin
ATTORNEY 2,957,049

PRESSURE APPLYING MEANS FOR THE TAPE OF A MAGNETIC RECORDER

Joseph M. Uritis, Haddonfield, N.J., assignor to Radio Corporation of America, a corporation of Delaware Filed Sept. 1, 1954, Ser. No. 453,627

8 Claims. (Cl. 179—100.2)

This invention relates to magnetic recording, and more particularly to pressure means for assuring intimate contact between a magnetic record member and a magnetic record transducer.

In the art of magnetic recording, there have arisen circumstances under which a relatively wide magnetic tape record member is used to carry a plurality of simultaneous record tracks. Apparatus employing this tape structure may, for example, be medium high speed automatic computer systems. In these systems, data is frequently converted to a binary digit code which are stored as magnetic bits in a plurality of parallel longitudinal record tracks spaced laterally across the width of a magnetic record tape. In other types of equipment, a wide band signal may be divided into frequency components and each component recorded in separate parallel tracks simultaneously.

It is of importance that an intimate contact be maintained between a signal transducer and the record tape. For this purpose, there has been provided, in the past, pressure means for exerting pressure on the back of a relatively narrow one or two channel record member. However, such means as have been provided in the past are not entirely suitable for exerting a uniform pressure across the full width of the relatively wider tape members used in the aforementioned multichannel systems.

Accordingly, it is an object of the present invention to provide improved means for exerting pressure on a record tape to press it into intimate contact with a record transducer.

It is another object of this invention to provide an improved pressure means as set forth characterized in that an equalized pressure is exerted on the full width of a relatively wide record member.

It is a further object of this invention to provide pressure means as set forth which is simple in structure and operation and is relatively inexpensive to make.

In accomplishing these and other objects, there has been provided, in accordance with the present invention, a pressure pad assembly which includes a pressure pad backing bar positioned adjacent the transducer and extending transversely of the tape. Mounting means are provided for carrying the pressure backing bar in such a manner that the pressure backing bar is free to rotate about an axis parallel to the direction of motion of the tape associated with the transducer. This permits the backing bar to be self-orienting and self-equalizing with respect to pressure applied across the width of the aforementioned tape.

Figure 1:
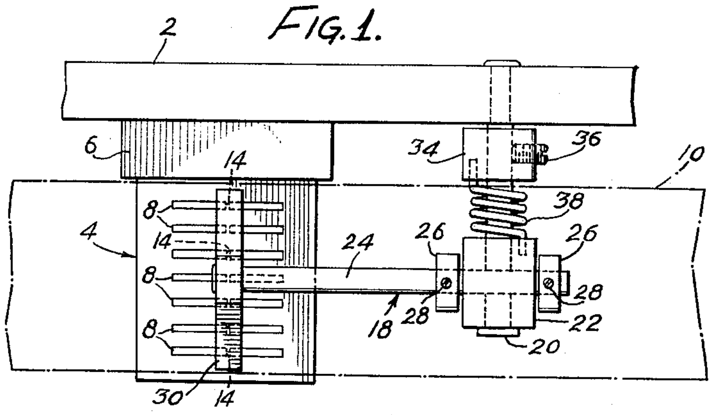
Figure 2:
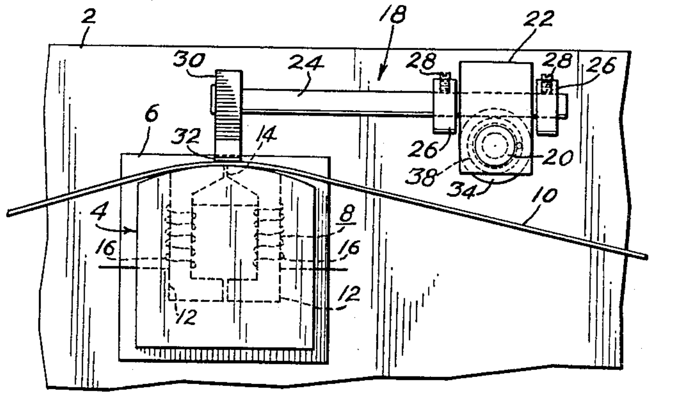
Figure 3:
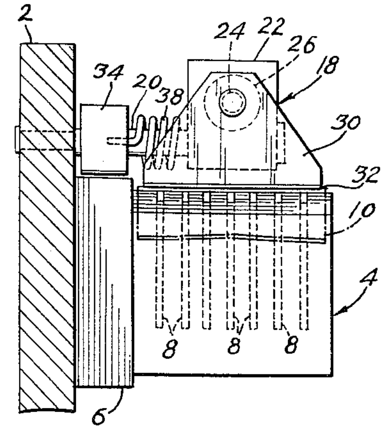

A better understanding of this invention may be had from the following detailed description when read in connection with the accompanying drawing, in which;

Fig. 1 is a plan view of a portion of a magnetic recording system embodying the present invention, Fig. 2 is an end view of the apparatus shown in Fig. 1, and Fig. 3 is an elevational view of the apparatus shown in Fig. 1.

Referring now to the drawing in more detail, there is shown a mounting panel 2 upon which is mounted the magnetic record transducer 4 carried by a suitable support means 6. The transducer 4 includes a plurality of laterally spaced, parallel head units 8 (seven units being illustrated). Such a head may be used, for example, in laying down a seven digit binary code which may be the code of a computer system. A relatively wide magnetic record receiving member or tape 10 is arranged to pass over the transducer 4 in contact with the several head units 8. The tape may, for example, be on the order of one-half inch, or more, in width. Each of the head units 8 comprises a two part core member 12 having a signal translating gap 14 positioned at the contact area of the head 8 with respect to the tape 10. A signal translating coil 16 is mounted in energy transfer relation on each of the core members 12.

A pressure pad assembly 18 is positioned to exert pressure on the back of the tape 10 in the area of the signal translating gaps 14 of the transducer 4. The pressure pad assembly 18 includes a mounting stud 20 which is fixedly secured to the mounting panel 2. A coupling member 22 is loosely carried on the stud 20. A pressure pad arm 24 is loosely carried along an axis substantially parallel to the direction of motion of the tape by the coupling member 22. In order to permit free rotational movement of the arm 24 with respect to the coupling member 22, but at the same time to limit translational motion with the arm 24 with respect to the coupling member 22, a pair of collars 26 are mounted on the arm 24, bracketing the coupling member 22, and locked in place as by set screws 28. Secured to the end of the arm 24 remote from the coupling member 22 is a rigid pressure pad backing member 30. The backing member 30 is of a width sufficient to at least span the full width of the tape 10, and is secured, at a point midway between its ends, to the arm 24. A shoe or pad 32 of suitable resilient material such, for example, as felt is held by the pressure pad backing member 30. The pressure pad member 32 may suitably be held on the backing member 30 by a cement.

In order to control the amount of pressure exerted on the back of the tape 10, by the pressure pad member 32, an adjustable spring bias is applied to the assembly 18. In the illustrated embodiment of this invention, a collar 34 is carried by the stud 20 and may be locked in any desired position thereon by a set screw 36. A spring 38 interconnects the collar 34 and the coupling member 22, one end of the spring 38 being anchored in each of these elements.

Inasmuch as the arm 24 is carried by the coupling member 22 in such a way as to permit freedom of rotational motion about the axis of the arm 24, the pressure exerted by the pressure pad 32 on the back of the tape 10 will be self-equalizing. That is, the pressure on one edge of the tape 10 can be no greater than the pressure on the other edge of the tape 10 since such an inequality in pressure would result in a rotational movement of the arm 24 about its axis.

There has thus been described an improved means for exerting pressure on a record tape to place the tape into intimate contact with the record transducer and characterized in that the exerted pressure will be self-equalizing with respect to the width of the record tape.

What is claimed is:

1. In a magnetic recording-reproducing system of the type wherein information is recorded simultaneously in a plurality of parallel adjacent record tracks on a magnetic record tape, a magnetic record transducer including a plurality of head units corresponding in number to the record tracks, each of said head units having a signal translating gap therein, said tape being longitudinally movable over said transducer in contact therewith at said gaps, a pressure member extending transversely of said tape and positioned to press said tape toward said transducer at said gaps, and mounting means for said pressure member movable toward and away from said transducer, said pressure member being pivotally mounted on said mounting means to pivot freely about an axis substantially parallel to the direction of movement of said tape.

2. In a magnetic recording-reproducing system of the type wherein information is recorded simultaneously in a plurality of parallel adjacent record tracks on a magnetic record tape, a magnetic record transducer including a plurality of head units corresponding in number to the record tracks, each of said head units having a signal translating gap therein, said tape being longitudinally movable over said transducer in contact therewith at said gaps, a pressure member extending transversely of said tape and positioned to press said tape toward said transducer at said gaps, mounting means for said pressure member, and bias means for biasing said pressure member toward said transducer, said pressure member being pivotally mounted on said mounting means to pivot freely about an axis substantially parallel to the direction of movement of said tape.

3. In a magnetic recording-reproducing system of the type wherein information is recorded simultaneously in a plurality of parallel adjacent record tracks on a magnetic record tape, a magnetic record transducer including a plurality of head units corresponding in number to the record tracks, each of said head units having a signal translating gap therein, said tape being longitudinally movable over said transducer in contact therewith at said gaps, a resilient pressure member extending transversely of said tape and positioned to press said tape toward said transducer at said gaps, a rigid backing member for said pressure member, an arm extending along an axis substantially parallel to the direction of motion of said tape, said backing member being secured to one end of said arm, and mounting means for pivotally carrying said arm for pivotal movement about said axis.

4. In a magnetic recording-reproducing system of the type wherein information is recorded simultaneously in a plurality of parallel adjacent record tracks on a magnetic record tape, a magnetic record transducer including a plurality of head units corresponding in number to the record tracks, each of said head units having a signal translating gap therein, said tape being longitudinally movable over said transducer in contact therewith at said gaps, a resilient pressure member extending transversely of said tape and positioned to press said tape toward said transducer at said gaps, a rigid backing member for said pressure member, an arm extending along an axis substantially parallel to the direction of motion of said tape, said backing member being secured to one end of said arm, mounting means for pivotally carrying said arm for pivotal movement about said axis, and biasing means associated with said mounting means for biasing said pressure member toward said transducer.

5. In a magnetic recording-reproducing system of the type employing a relatively wide magnetic record tape and a transducer structure at least as wide as said tape, pressure means for pressing said tape into intimate contact with said transducer along almost the entire width thereof, said pressure member including a resilient pressure member extending transversely of said tape at said transducer, a rigid backing member for said pressure member, an arm extending along an axis substantially parallel to the direction of movement of said tape over said transducer structure, said backing member being secured to one end of said arm, and mounting means for pivotally carrying said arm for pivotal movement about said axis.

6. In a magnetic recording-reproducing system of the type employing a relatively wide magnetic record tape and a transducer structure at least as wide as said tape, pressure means for pressing said tape into initimate contact with said transducer along almost the entire width thereof, said pressure means including a resilient pressure member extending transversely of said tape at said transducer, a rigid backing member for and coextensive with said pressure member, an arm extending along an axis substantially perpendicular to said backing member and parallel to the direction of movement of said tape across said transducer structure, said backing member being secured substantially midway between its ends to one end of said arm, mounting means for pivotally carrying said arm for pivotal movement about said axis, and biasing means associated with said mounting means for biasing said pressure member toward said transducer.

7. Apparatus for applying pressure to a movable tape which passes over a member disposed on one side of said tape, said apparatus comprising pivot means providing a pivotal axis transverse to the direction of movement of said tape, an arm mounted on said pivot means and movable about said axis and with respect to said member in directions toward and away from said tape, and a pad carried by said arm and mounted thereon for rotary movement on another axis parallel to the direction of movement of said tape for pressing said tape against said member.

8. Apparatus for applying pressure to a movable tape which passes over a stationary member, said apparatus comprising a shoe for pressing said tape against said member, a support for carrying said shoe elevated above said tape, means for mounting said support for movement about an axis parallel to the direction of movement of said tape, and means for pivotally mounting said support for movement about another axis transverse to the direction of movement of said tape for providing a degree of rotational freedom for rotating said shoe toward and away from said tape.

References Cited in the file of this patent

UNITED STATES PATENTS

| | | |
|---|---|---|
| 2,603,721 | Camras | July 15, 1952 |
| 2,689,274 | Saeger | Sept. 14, 1954 |
| 2,698,359 | Roberts | Dec. 28, 1954 |
| 2,782,041 | Muller | Feb. 19, 1957 |
| 2,783,311 | Scott | Feb. 26, 1957 |

FOREIGN PATENTS

| | | |
|---|---|---|
| 277,365 | Switzerland | Nov. 16, 1951 |